United States Patent
Liu et al.

(10) Patent No.: US 10,778,107 B2
(45) Date of Patent: Sep. 15, 2020

(54) SERIES RESONANT CONVERTER

(71) Applicant: Huang-Jen Chiu, New Taipei (TW)

(72) Inventors: Yu-Chen Liu, Taipei (TW); Chen Chen, New Taipei (TW); Kai-De Chen, Tainan (TW); Guan-Wei Lin, Taipei (TW); De-Jia Lu, Taoyuan (TW); Katherine Ann Kim, Marquette, MI (US); Huang-Jen Chiu, New Taipei (TW)

(73) Assignee: Huang-Jen Chiu, New Taipei (TW)

(*) Notice: Subject to any disclaimer, the term of this patent is extended or adjusted under 35 U.S.C. 154(b) by 0 days.

(21) Appl. No.: 16/222,511

(22) Filed: Dec. 17, 2018

(65) Prior Publication Data

US 2020/0083817 A1 Mar. 12, 2020

(30) Foreign Application Priority Data

Sep. 12, 2018 (TW) .............................. 107132063 A

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01)

(58) Field of Classification Search
CPC .......................... H02M 1/08; H02M 3/33592
USPC ..................................................... 363/21.02
See application file for complete search history.

(56) References Cited

U.S. PATENT DOCUMENTS

| 9,729,059 B1* | 8/2017 | Parto ....................... H02M 3/00 |
| 2019/0043660 A1* | 2/2019 | Jin ........................... H02M 1/44 |

FOREIGN PATENT DOCUMENTS

| TW | M369589 U1 | 11/2009 |
| TW | 201037955 A1 | 10/2010 |
| TW | M417719 U1 | 12/2011 |
| TW | 201714391 A | 4/2017 |

* cited by examiner

*Primary Examiner* — Shawki S Ismail
*Assistant Examiner* — Monica Mata
(74) *Attorney, Agent, or Firm* — Li & Cai Intellectual Property (USA) Office

(57) ABSTRACT

A series resonant converter includes a switching circuit, a resonant tank, a transformer and a rectifier circuit. The switch circuit has a power supply connected to the primary side upper bridge switch and the primary side lower bridge switch, which are configured to control the input voltage and the input current of the power supply. The resonant tank is coupled to the switch circuit and includes a resonant inductor, a resonant capacitor, and a magnetizing inductor connected in series. The transformer is coupled to the resonant tank and includes a core, a primary winding, and at least four groups of secondary windings. The core has a center column, the primary winding is wound on the center column, and at least four secondary windings are wound on the center column. The number of equivalent windings added by the at least four groups of secondary windings is 1.

9 Claims, 19 Drawing Sheets

SERIES RESONANT CONVERTER

CROSS-REFERENCE TO RELATED PATENT APPLICATION

This application claims the benefit of priority to Taiwan Patent Application No. 107132063, filed on Sep. 12, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present invention relates to a series resonant converter, and more particularly to a series resonant converter designed based on an LLC series resonant converter, which reduces the loss of the output current on the winding by a fractional-turn transformer structure.

BACKGROUND OF THE DISCLOSURE

LLC-type series resonant converter (LLC SRC) can be provided with characteristics that switches on the primary side can be zero-voltage switched and synchronous rectifier components on the secondary side can be zero-current switched. When the switch operation frequency of the converter is between the first resonant point and the second resonant point, zero-switching condition for the converter is independent of the load, and thus the characteristics that the zero-voltage switching (ZVS) for switches on the primary side and the zero-current switching (ZCS) for rectifier components on the secondary side can be achieved in a full range from lightly loaded to full loaded.

For a high wattage and low voltage output LLC series resonant converter architecture, the copper loss of the output winding and the loss of the magnetic component are one of the main sources of loss, and the overall volume is determined by the size of the magnetic component.

Therefore, how the above defects can be overcome to improve the copper loss of the output winding and the loss of the magnetic component through the improvement of the circuit and structure design has become an important issue in the art.

SUMMARY OF THE DISCLOSURE

In response to the above-referenced technical inadequacies, the present disclosure provides a series resonant converter, which reduces the loss of the output current on the winding by a fractional-turn transformer structure.

In one aspect, the present disclosure provides a series resonant converter, which includes a switching circuit, a resonant tank, a transformer and a rectifier circuit. The switching circuit has a power source connected to a primary side upper bridge switch and a primary side lower bridge switch, and the primary side upper bridge switch and the primary side lower bridge switch are configured to control an input voltage and an input current from the power source. The resonant tank is coupled to the switching circuit, which includes a resonant inductor, a resonant capacitor and a magnetizing inductor connected in series. The transformer is coupled to the resonant tank, and the transformer includes a magnetic core, a primary side winding, and at least four secondary side windings. The magnetic core has a center column, the primary side winding is wound on the center column, the at least four secondary side windings is wound on the center column, in that a number summed by equivalent winding turns of the at least four secondary side windings is 1. The rectifier circuit having a plurality of secondary side output rectifier switches coupled to the transformer, configured to receive and rectify an output voltage and an output current of the transformer, wherein the plurality of secondary side output rectifier switches are coupled to an output capacitor and a load.

One of the advantages of the series resonant converter provided by the present invention generates a magnetic field, by the technical feature of "the number summed by equivalent winding turns of the secondary side windings is 1", being the same as that of an conventional condition in which a winding is wound on the center column for 1 turn, and since uncompleted corner does not present in the magnetic field, an unbalanced effect for the inner magnetic field of the transformer will not be generated.

Furthermore, another advantages of the series resonant converter provided by the present disclosure can provided a complete one turn winding, by the technical feature of "the winding turns of the secondary side windings are one quarter turn", for the secondary side windings of the transformer when considering directions of the current, and since each of the windings are connected in series, 0.25 of this fractional turn for the output windings on the secondary side of the transformer can be achieved, and the copper loss on the secondary side windings of the transformer in an output condition with large current can be effectively reduced while comparing with the transformer with conventional windings.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
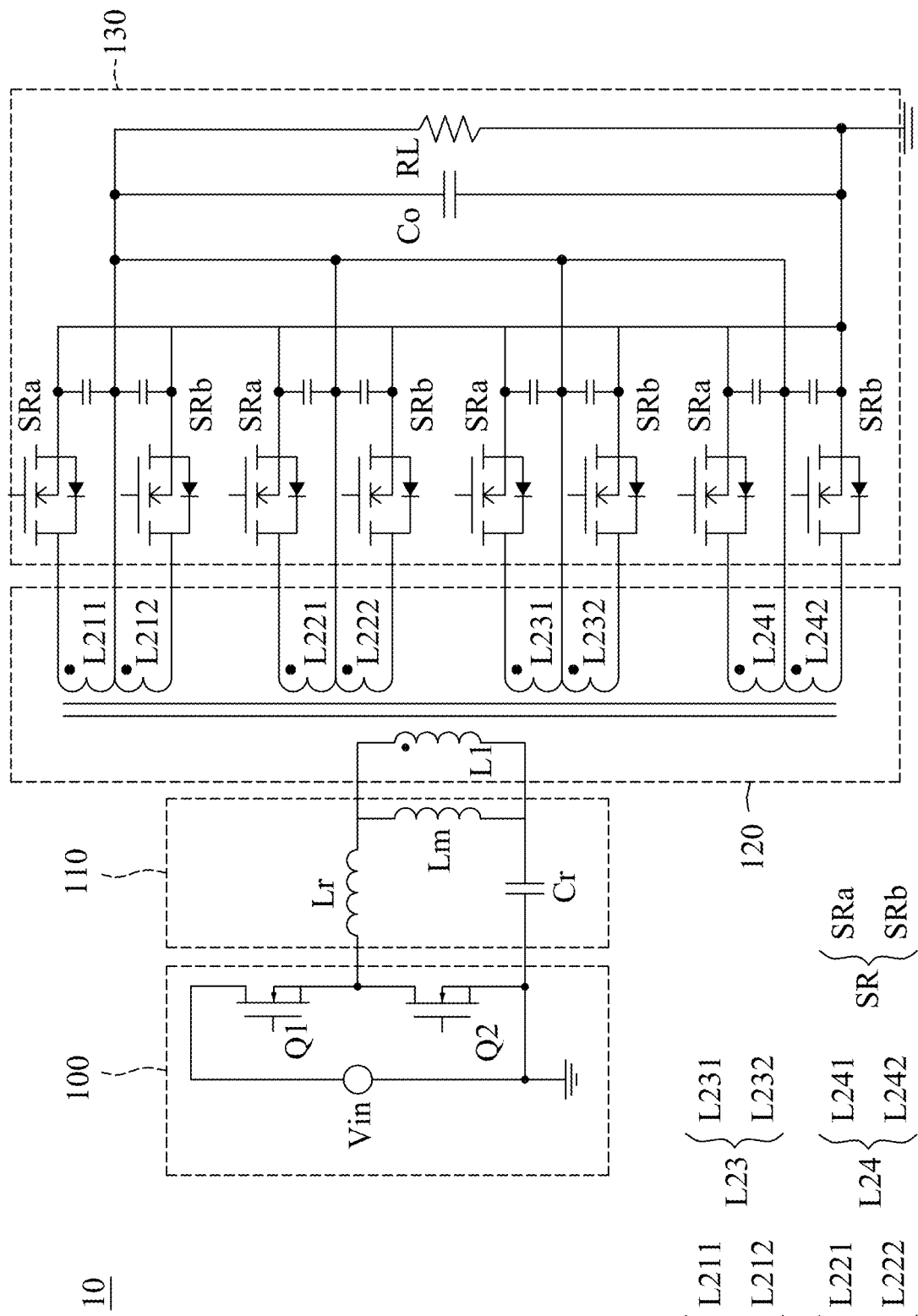
FIG. 1 is a circuit layout of a series resonant converter according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The embodiments of the "series resonant converter" disclosed in the present disclosure are described below by way of specific embodiments, and those skilled in the art can understand the advantages and effects of the present disclosure from the disclosure of the present specification. The present disclosure can be implemented or applied in various other specific embodiments, and various modifications and changes can be made without departing from the spirit and scope of the present disclosure. In addition, the drawings of the present disclosure are merely illustrative and are not intended to be stated in the actual size. The following embodiments will further explain the related technical content of the present disclosure, but the disclosed content is not intended to limit the scope of the present disclosure.

It should be understood that, although the terms "first", "second", "third", and the like may be used herein to describe various elements or signals, however, these elements or signals are not limited by these terms. These terms are primarily used to distinguish one element from another or one signal from another. In addition, the term "or" as used herein may include a combination of any one or more of the associated listed items, depending on the actual situation.

Figure 2:
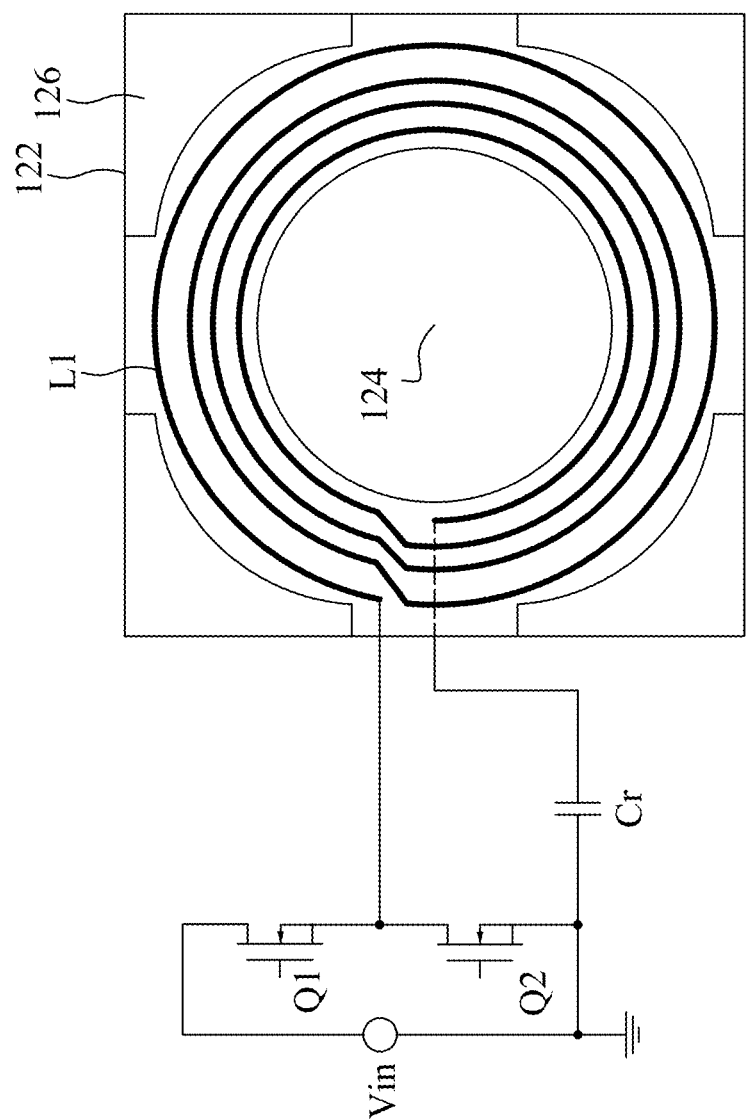
FIG. 2 is a schematic diagram of a primary side winding of the series resonant converter according to an embodiment of the present disclosure.
Figure 3:
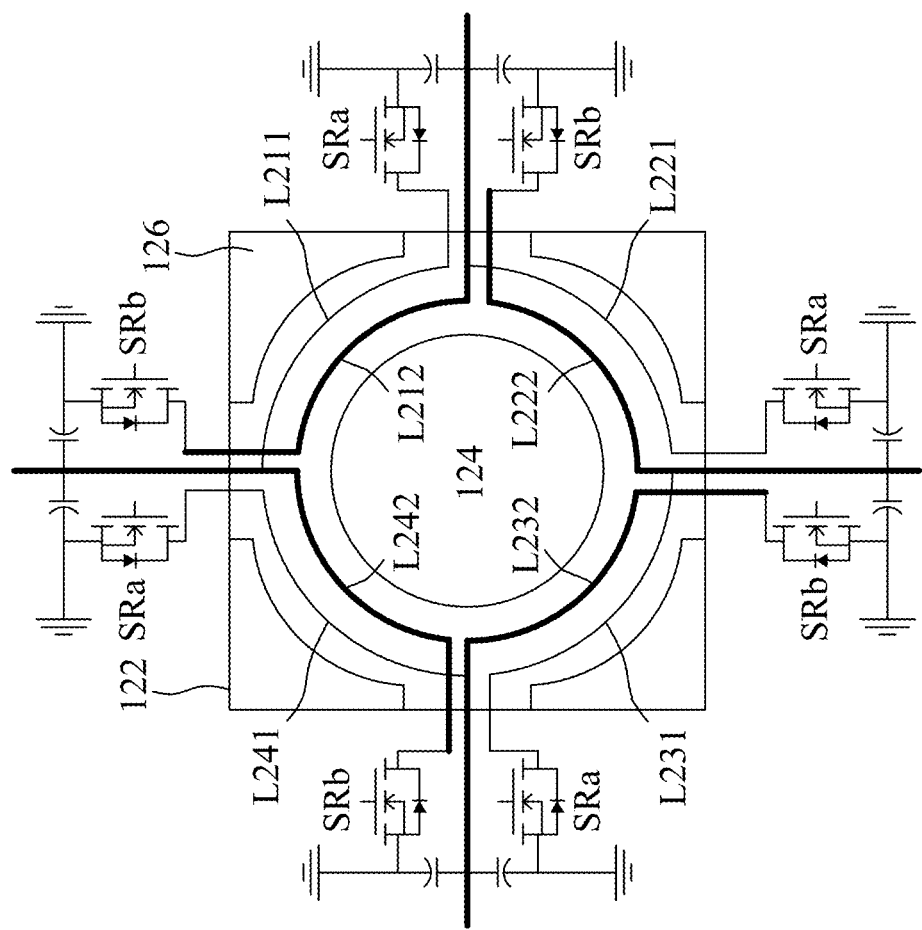
FIG. 3 is a schematic diagram of secondary side windings of the series resonant converter according to an embodiment of the present disclosure.

Reference is now mad to FIGS. 1 to 3, FIG. 1 is a circuit layout of a series resonant converter according to an embodiment of the present disclosure, FIG. 2 is a schematic diagram of a primary side winding of the series resonant converter according to an embodiment of the present disclosure, and FIG. 3 is a schematic diagram of secondary side windings of the series resonant converter according to an embodiment of the present disclosure. A first embodiment of the present disclosure provides a series resonant converter 10, which includes a switching circuit 100, a resonant tank 110, a transformer 120 and a rectifier circuit 130. The switching circuit 100 has a power source Vin connected to a primary side upper bridge switch Q1 and a primary side lower bridge switch Q2, and the primary side upper bridge switch Q1 and the primary side lower bridge switch Q2 are configured to control an input voltage and an input current from the power source Vin.

The resonant tank 110 is coupled to the switching circuit 100, which includes a resonant inductor Lr, a resonant capacitor Cr and a magnetizing inductor Lm connected in series. The transformer 120 is coupled to the resonant tank 110, and the transformer 120 includes a magnetic core 122, a primary side winding L1, and four secondary side windings L21, L22, L23 and L24.

As shown in FIG. 2, the magnetic core 122 is designed as a four-column square magnetic core to be used by the transformer 120, and the material of the magnetic core 122 may select SF36 MnZn power ferrite material produced by Ferroxcube, the material has a good loss performance at high frequencies. The magnetic core 122 has a center column 124, here, the primary side winding L1 and the secondary side winding L2 are wound around the center column 124 of the magnetic core 112, and a number of turns of the primary side winding L1 can be four turns, as shown in FIG. 2, and a number of equivalent winding turns summed by the four secondary windings L21, L22, L23 and L24 is 1. In addition, the magnetic core 112 further includes four outer columns 126, and the four secondary side windings L21, L22, L23 and L24 are respectively coupled to the secondary side output rectifier switch SR via spaces between two of the outer side columns 126. In the present embodiment, the secondary side windings L21, L22, L23, and L24 are each 0.25 turns, and an actual winding distribution diagram can be seen in FIG. 3. In other examples, the magnetic core 112 may also include eight outer columns.

The rectifier circuit 130 has a plurality of secondary side output rectifier switches SR, configured to receive and rectify an output voltage and an output current of the transformer 120, and the plurality of secondary side output rectifier switches SR are coupled to an output capacitor Co and a load RL. In this embodiment, S pin of each of the secondary side output rectifier switch SR is connected to ground, and D pins of the secondary side output rectifier switch SR is connected to the secondary side windings L21, L22, L23 and L24, respectively, and the secondary windings L21, L22, L23 and L24 are also connected to a positive output terminal.

In more detail, the four secondary side windings L21, L22, L23 and L24 each has a central tap structure, which include positive half cycle windings L211, L221, L231, L241 and negative half cycle windings L212, L222, L232, L242, and each of the four secondary side output rectifier switches SR includes a positive half cycle rectifier switch SRa and a negative cycle rectifier switch SRb, here, the positive half cycle windings L211, L221, L231, L241 are respectively coupled to the positive half cycle rectifier switches SRa, the negative half cycle windings L212, L222, L232, L242 are respectively coupled to the negative half cycle rectifier switches SRb, and the number of equivalent winding summed by the positive half cycle windings L211, L221, L231 and L241 is 1, while the number of equivalent winding summed by the negative half cycle windings L212, L222, L232 and L242 is 1. In this case, numbers of winding turns of the positive half cycle windings L211, L221, L231 and L241 and the negative half cycle windings L212, L222, L232 and L242 may each be 0.25. Similarly, eight secondary windings with winding turns of 0.125 collocated with the magnetic core 112 with eight outer columns can be used.

In the present embodiment, the resonant tank 110 consists of the resonant inductor Lr, the resonant capacitor Cr, and the magnetizing inductance Lm. By the interleaved switching of the primary side upper bridge switch Q1 and the primary side lower bridge switch Q2, energy is transmitted from the resonant tank 110 and the transformer 120 to the secondary side output, and a dead-time in that the primary side upper bridge switch Q1 and the primary side lower bridge switch Q2 stop to switch are utilized to release the energy stored on the parasitic capacitance of the primary side upper bridge switch Q1 and the primary side lower bridge switch Q2 to zero, and a characteristic that the series resonant converter can be zero-voltage switched to ON state are achieved.

In detail, the half-bridge series resonant circuit operates in a Series Resonant Converter (SRC) resonance mode and a LLC-Type Series Resonant Converter resonance mode, respectively. The magnetizing inductor Lm determines whether to participate in resonance according to different switching operation regions. In SRC mode, the magnetizing inductor Lm does not participate in resonance, the first resonant frequency is determined by the resonant inductor Lr1 and the resonant capacitor Cr1, and since the resonant inductor Lr, the resonant capacitor Cr of the resonant circuit, and the load are in series relationship, therefore, the maximum voltage gain for the SRC resonant mode generates when the switching frequency FSW operates with a first resonant frequency FR1, as shown in the following equation (1):

$$fsw = fr1 = \frac{1}{2\pi\sqrt{LrCr}} \quad \text{equation (1)}$$

In the LLC mode, the magnetizing inductor Lm participates in resonance, which forms a resonant network with the resonant inductor Lr and the resonant capacitor Cr1. The magnetizing inductor Lm merges with the resonant inductor Lr, and then produces a second resonant frequency FR2 with the resonant capacitor Cr, as shown in the following equation (2):

$$fr2 = \frac{1}{2\pi\sqrt{(Lv+Lm)Cr}} \quad \text{equation (2)}$$

Three intervals can be divided on the frequency response curve by two resonant frequency points, that is, the first resonant frequency fr1 and the second resonant frequency fr2. The biggest difference between the operation in LLC mode and the SRC mode is that the voltage gain of the LLC mode is greater than 1, in addition, the zero voltage switching condition of an power transistor in this operation mode is only related to the magnetizing inductor Lm, but is independent of the output current, which means that the zero voltage switching condition can be satisfied as long as the current on the magnetizing inductor is large enough.

On the other hand, when the converter is switched to a frequency fsw to be operated in the LLC mode, the operating frequency is less than the first resonant frequency fr1 and greater than the second resonant frequency fr2. The resonant current is decreased to be equal to a magnetizing current before the switch is cutoff. When the resonant current is equal to the magnetizing current, the current does not flow into the primary side of the transformer 120, and there is no energy transfer to the load end, the output rectifier switch reaches zero-current cutoff since there is no current flow thereto, and thus the output voltage cannot clamp the magnetizing inductor Lm with the transformer 120 via the output rectifier switch. In this region, the resonant element including the resonant inductor Lr, the resonant capacitor Cr, and the magnetizing inductor Lm enters a second resonant mode. Preferably, the series resonant converters of the present disclosure operate in the second region.

Figure 4A:
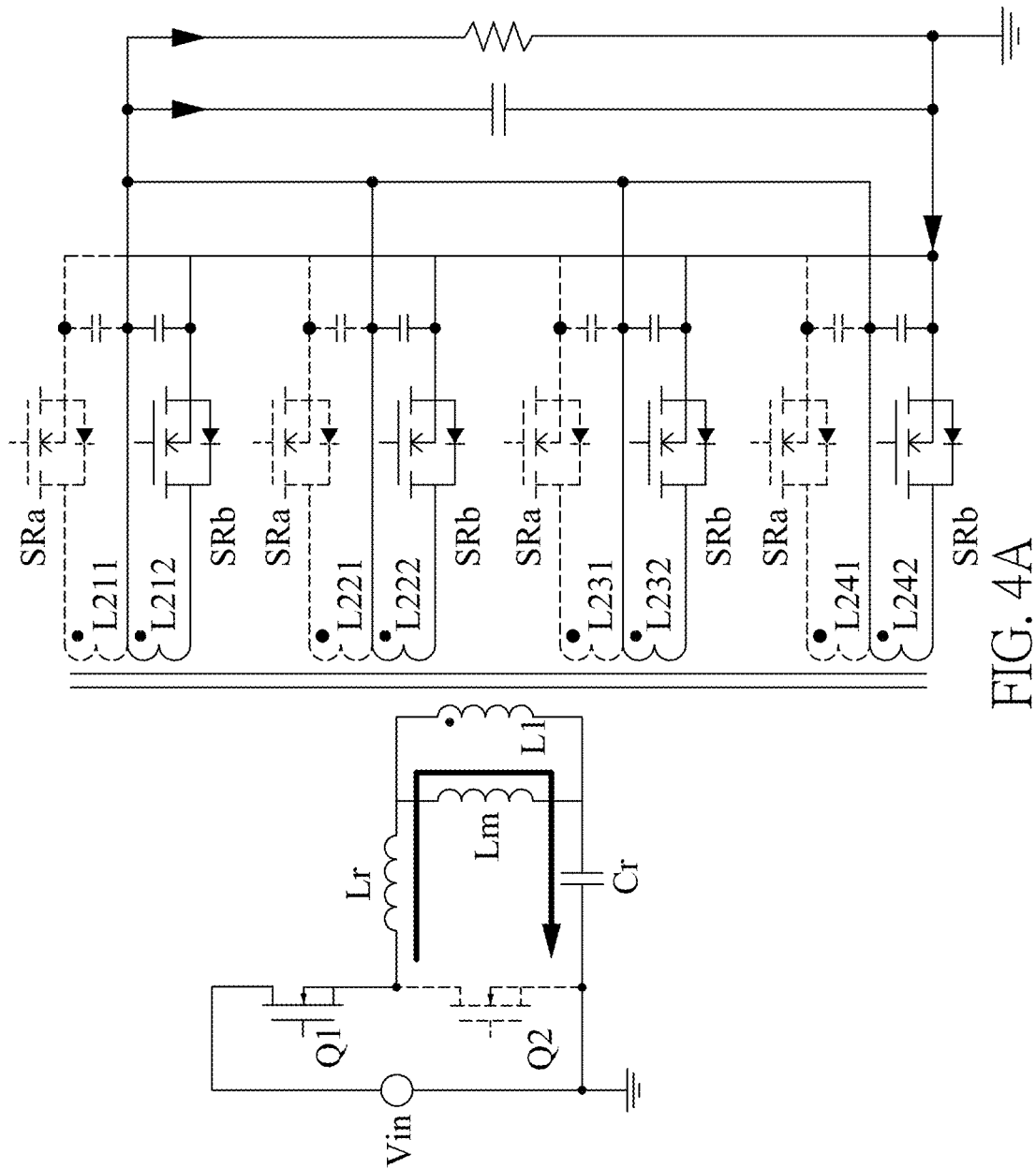
FIG. 4A is a schematic diagram of positive half cycle current paths of the series resonant converter according to an embodiment of the present disclosure.
Figure 4B:
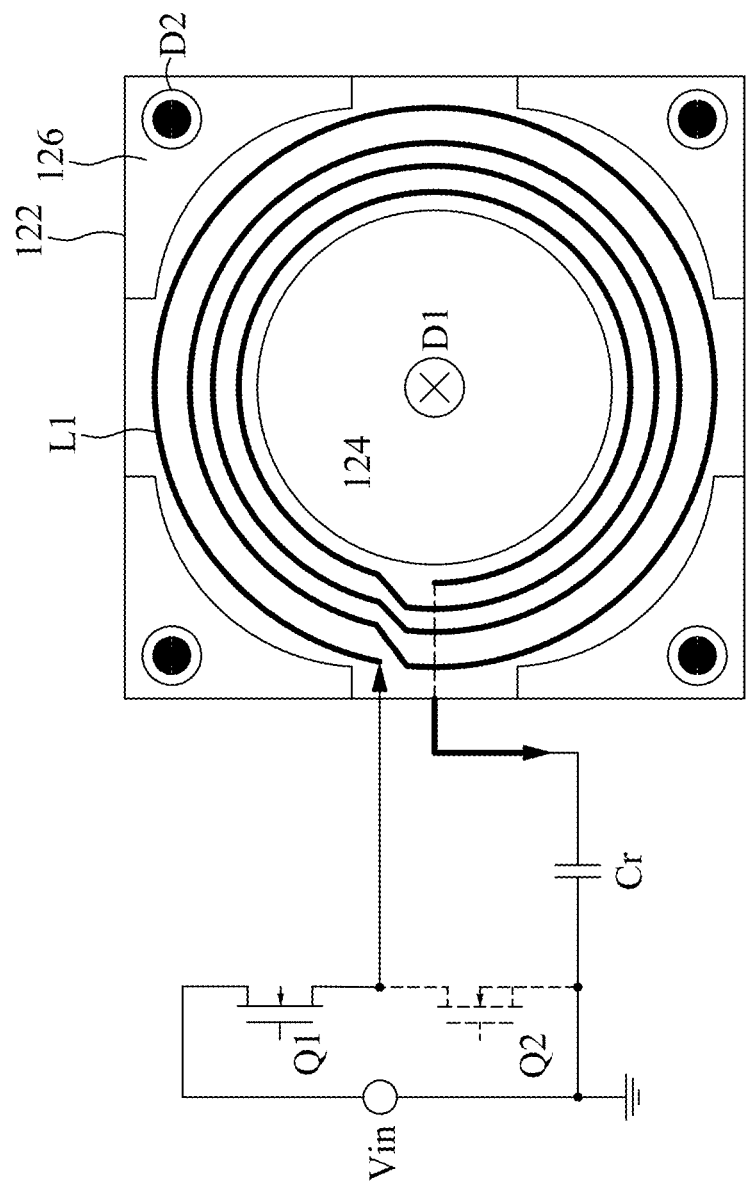
FIG. 4B is a schematic diagram of current paths of a positive half cycle winding of the primary side winding of the series resonant converter according to an embodiment of the present disclosure.
Figure 4C:
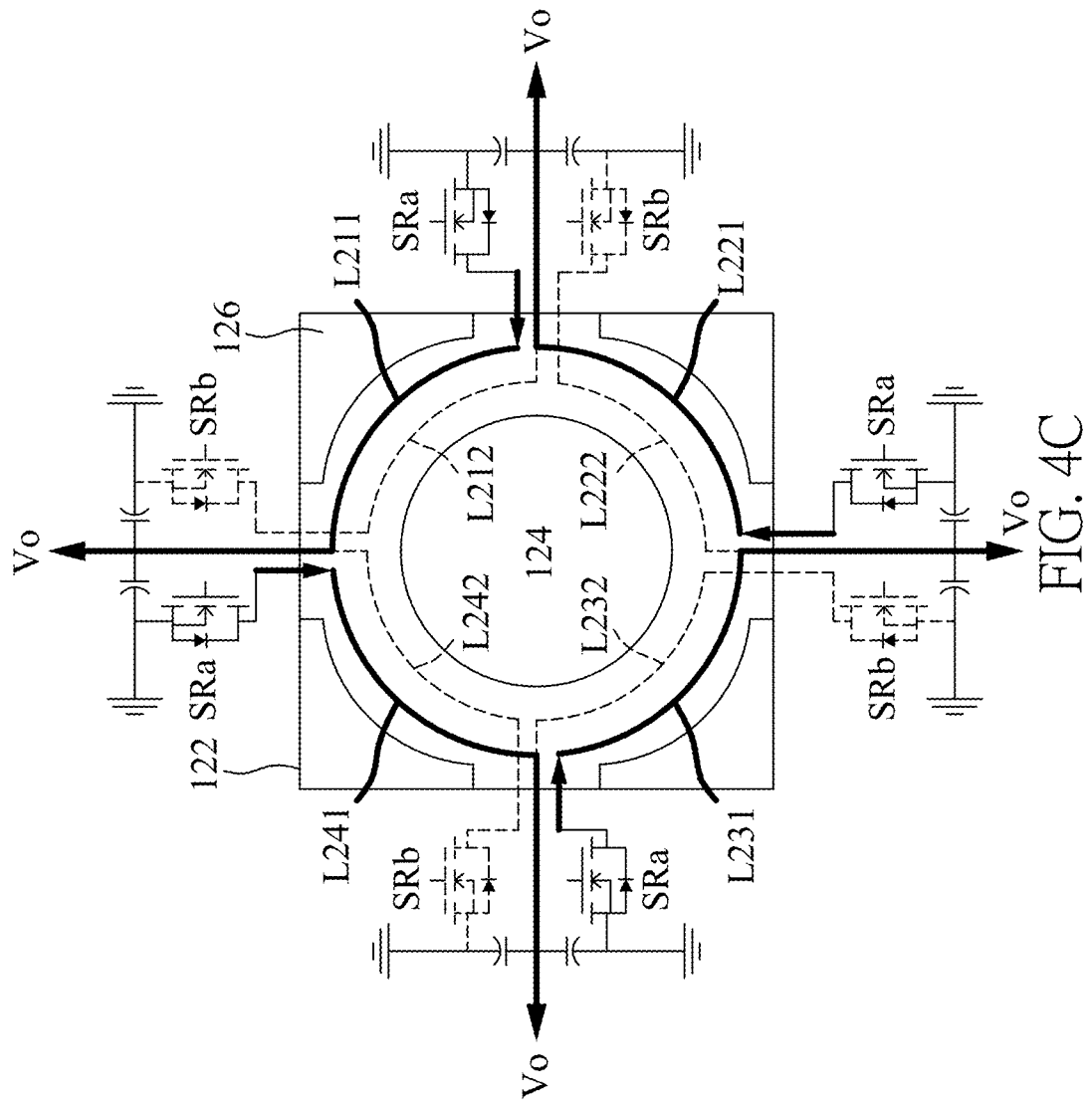
FIG. 4C is a schematic diagram of current paths of a positive half cycle winding of the secondary side windings of the series resonant converter according to an embodiment of the present disclosure.

Reference is now made to FIGS. 4A to 4C, FIG. 4A is a schematic diagram of positive half cycle current paths of the series resonant converter according to an embodiment of the present disclosure, FIG. 4B is a schematic diagram of current paths of a positive half cycle winding of the primary side winding of the series resonant converter according to an embodiment of the present disclosure, and FIG. 4C is a schematic diagram of current paths of a positive half cycle winding of the secondary side windings of the series resonant converter according to an embodiment of the present disclosure.

As shown in the figure, in a positive half cycle operation mode, the primary side upper bridge switch Q1 is turned on, the primary side lower bridge switch Q2 is turned off, each of the positive half cycle rectifier switches SRa is turned on, and each of the negative half cycle rectifier switches SRb is turned off. At this time, the current flows clockwise in the present embodiment, causing an induced magnetic field in the magnetic core 122, and directions D1, D2 of the magnetic field are as shown. According to Faraday's law, it can be known that the secondary side of the transformer 120 generates a counterclockwise current against the applied magnetic field, and the current on the secondary side of the transformer 120 flows from the ground to the negative half cycle rectifier switch SRb, the positive half cycle windings L211, L221, L231, L241, to the contact Vo.

Here, any contact Vo is connected to the same node with the remaining three contacts Vo, and any one point of the ground levels is connected to the same node with the remaining three points of the ground level, as shown in FIG. 4C. Therefore, the positive half cycle windings L211, L221, L231, and L241 can be regarded as being connected in parallel relationship and the number of equivalent turns on the secondary side is 0.25 turns. Here, since the four secondary side windings L21, L22, L23 and L24 are wound on the center column 124 and the number of equivalent winding turns summed by the four secondary side windings L21, L22, L23 and L24 satisfies a condition of 1 turn, the generated magnetic field is the same as that of the existed condition in which a winding is wound on the center column for 1 turn, and thus the uncompleted corner does not present in the inner magnetic field in the transformer 124, thereby avoiding an unbalanced effect.

Figure 5A:
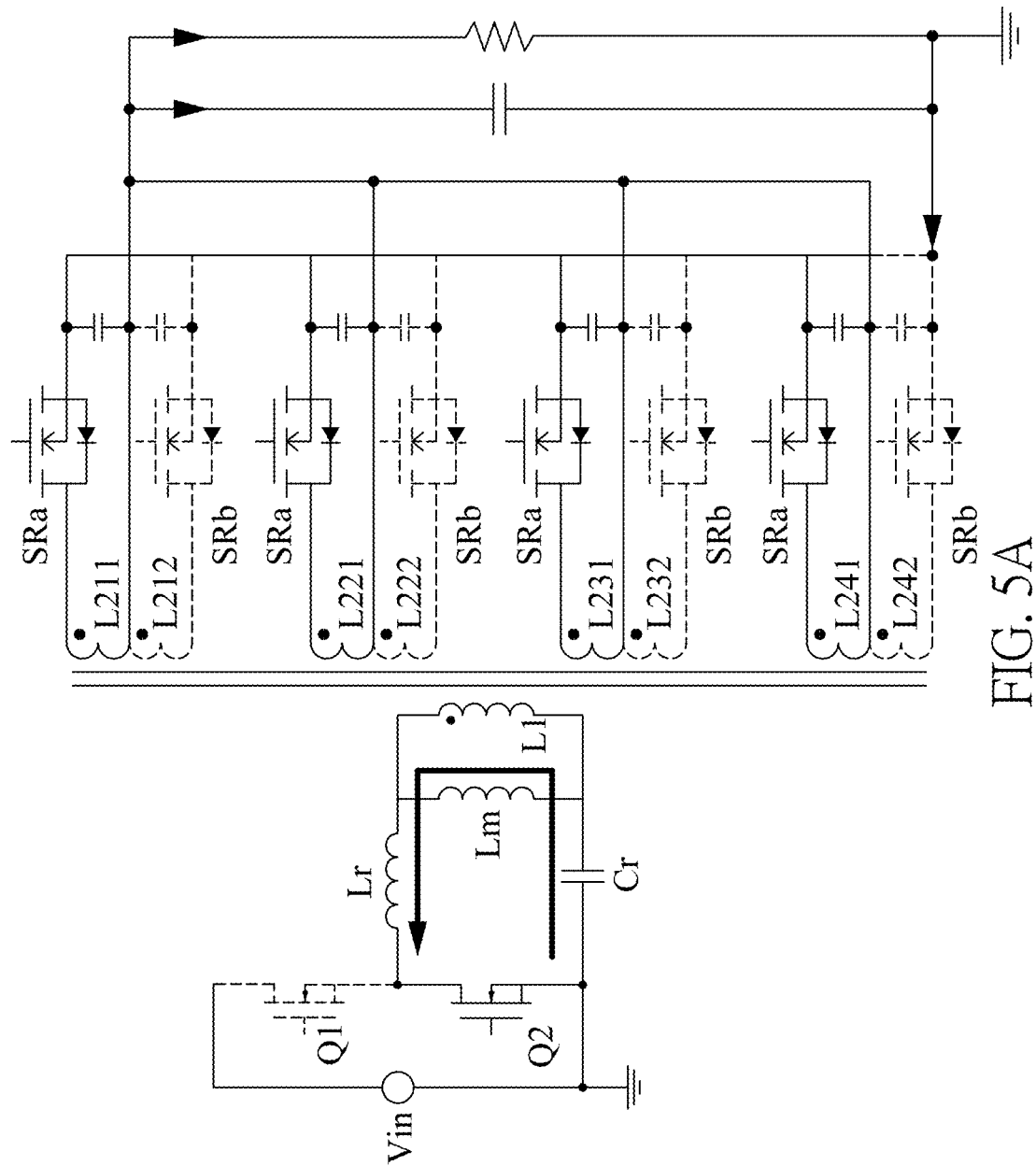
FIG. 5A is a schematic diagram of negative half cycle current paths of the series resonant converter according to an embodiment of the present disclosure.
Figure 5B:
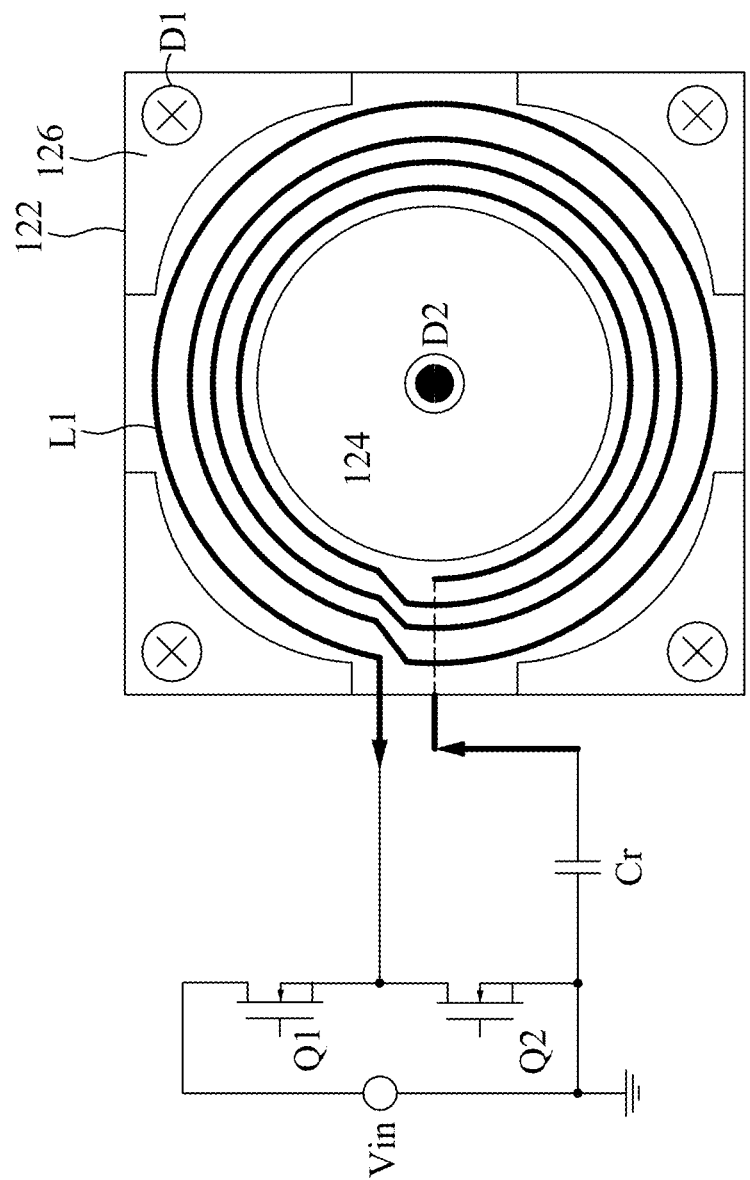
FIG. 5B is a schematic diagram of current paths of a negative half cycle winding of the primary side winding of the series resonant converter according to an embodiment of the present disclosure.
Figure 5C:
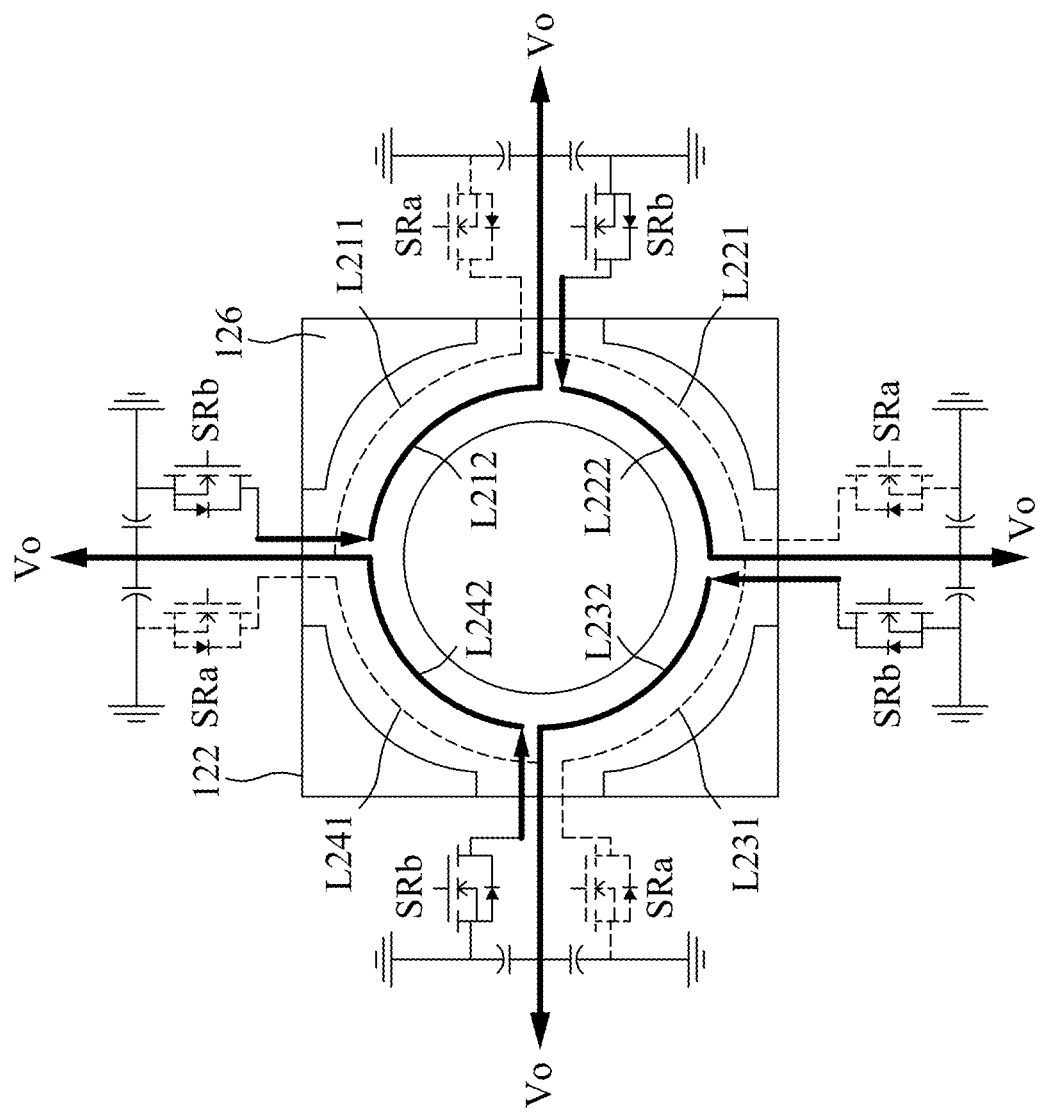
FIG. 5C is a schematic diagram of current paths of a negative half cycle winding of the secondary side windings of the series resonant converter according to an embodiment of the present disclosure.

Reference is now made to FIGS. 5A to 5C, FIG. 5A is a schematic diagram of negative half cycle current paths of the series resonant converter according to an embodiment of the present disclosure, FIG. 5B is a schematic diagram of current paths of a negative half cycle winding of the primary side winding of the series resonant converter according to an embodiment of the present disclosure, and FIG. 5C is a schematic diagram of current paths of a negative half cycle winding of the secondary side windings of the series resonant converter according to an embodiment of the present disclosure.

As shown in the figures, in a negative half cycle operation mode, the primary side upper bridge switch Q1 is turned off, the primary side lower bridge switch Q2 is turned on, each of the positive half cycle rectifier switches SRa is turned off, and each of the negative half cycle rectifier switches SRb is turned on. At this time, the current flows counterclockwise in the present embodiment, causing an induced magnetic field in the magnetic core 122, and directions D1, D2 of the magnetic field are as shown. Similarly, according to Faraday's law, it can be known that current paths generated on the primary side winding and the four secondary side windings L21, L22, L23 and L24 in the negative half cycle operation mode are different from those in the positive half cycle operation mode. In other word, the secondary side of the transformer 120 generates a clockwise current against the applied magnetic field, and the current on the secondary side of the transformer 120 flows from the ground to the positive half cycle rectifier switches SRa, the negative half cycle windings L212, L222, L232, L242, to the contact Vo. Here, any contact Vo is connected to the same node with the remaining three contacts Vo, and any one point of the ground levels is connected to the same node with the remaining three points of the ground level, as shown in FIG. 5C. Therefore, the negative half cycle windings L212, L222, L232, and L242 can be regarded as being connected in parallel relationship and the number of equivalent turns on the secondary side is 0.25 turns. Here, since the four secondary side windings L21, L22, L23 and L24 are wound on the center column 124 and the number of equivalent winding turns summed by the four secondary side windings L21, L22, L23 and L24 satisfies a condition of 1 turn, the generated magnetic field is the same as that of the existed condition in which a winding is wound on the center column for 1 turn, and thus the uncompleted corner does not present in the inner magnetic field in the transformer 124, thereby avoiding an unbalanced effect.

As can be seen from the FIGS. 4B, 4C and FIGS. 5B and 5C, when any switch is turned on and current flows in the transformer 120, the secondary side windings L21, L22, L23, and L24 of the transformer 120 can be equivalent to a complete turn in the current flow direction, and thus the method is equivalent to the existing transformer winding method while considering the magnetic flux, and there is no flux imbalance problem inherent in other fractional windings. Since each winding is in parallel relationship, it can achieve 0.25 of fractional turns for the output winding on the secondary side of the transformer. Compared with the conventional winding method, the copper loss on the secondary side windings L21, L22, L23 and L24 of the transformer 120 under the condition of large current output can be reduced.

In addition, under the conditions of high voltage input and high power density, power components with high voltage resistance, high frequency resistance and small volume are basic requirements, therefore, under this consideration, critical breakdown electric field of material can be regarded as an important parameter, and a higher breakdown electric field means that the component can be provided with high voltage resistance with a smaller volume. Therefore, the primary side upper bridge switch Q1 and the primary side lower bridge switch Q2 can utilize enhanced GaN field effect transistors, and since the breakdown electric field of gallium nitride is ten times higher than that of the silicon element, it is suitable for operating at a high voltage while reducing the size to achieve miniaturization. Compared with the tantalum carbide component whose breakdown electric field is more than ten times higher than that of the tantalum component, the electron mobility ($\mu$) of the gallium nitride component is also more than three times than that of the tantalum carbide component. Therefore, the gallium nitride element can be switched at a higher speed, which facilitates operation under high frequency.

Figure 6:
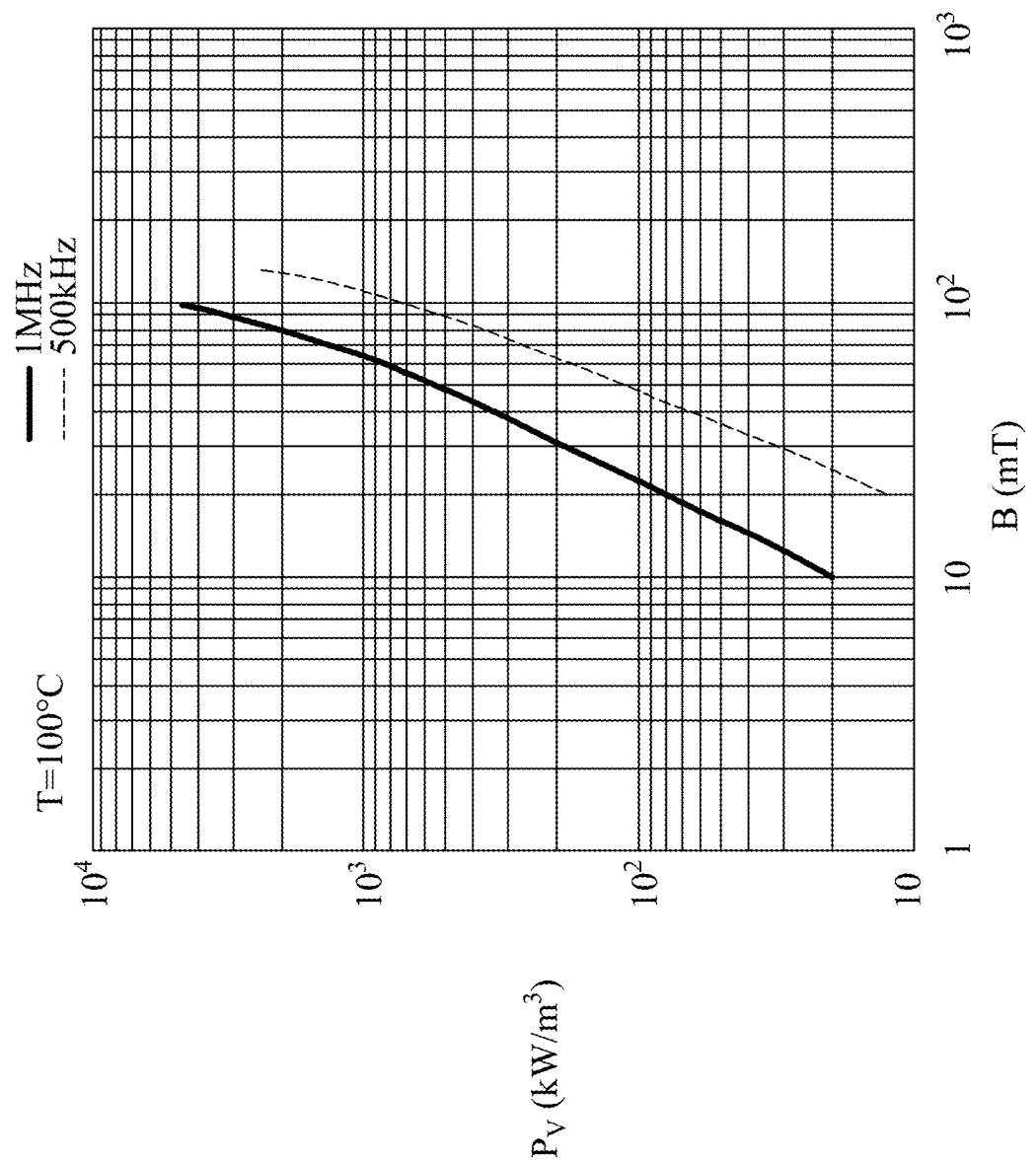
FIG. 6 is a graph showing a relationship between the unit volume loss and the magnetic flux density of the magnetic core material according to an embodiment of the present disclosure.

Before actually designing the magnetic core, it is necessary to confirm the circuit specifications that need to be achieved by the present disclosure. The circuit specifications implemented by the present disclosure provides a half-bridge series resonant converter circuit having an input voltage of 380V, an output voltage of 12V, and a switching frequency for power switches of 1 MHz. The material of the magnetic core of the present disclosure may select SF36 MnZn power ferrite material produced by Ferroxcube, the material has a good loss performance at high frequencies. A relationship between the unit volume loss and the magnetic flux density of the magnetic core material is shown in FIG. 6, a unit of the magnetic flux density B along a horizontal axis is Tesla T, and a unit of the unit volume loss $P_{cv}$ along the vertical axis is W/m$^3$. When the magnetic core of this material is operated at 1 MHz, the data is only provided to 0.1T, and when the magnetic flux exceeds 0.08T, the loss curve rises sharply. Therefore, the maximum value of the magnetic flux in the operation should be designed to be below 0.08T as much as possible in order to achieve better efficiency performance.

Figure 7:
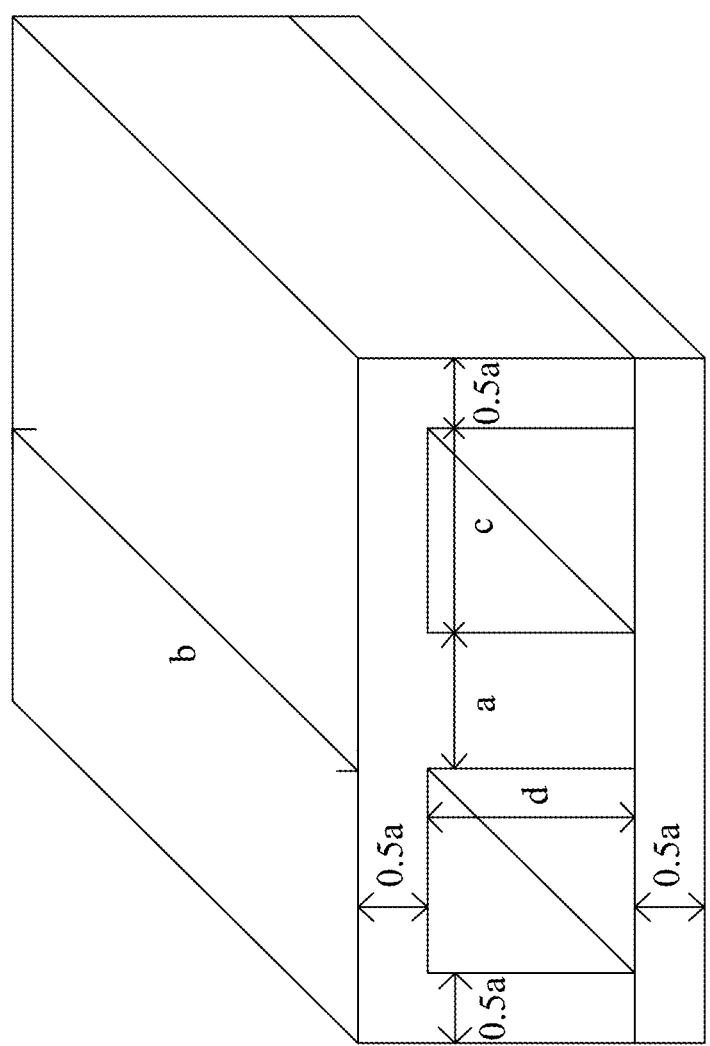
FIG. 7 is volume parameters of an EI type magnetic core according to an embodiment of the present disclosure.

By parameterizing the volume of the magnetic core and the length of the windings, the secondary windings with 1 turn, 0.5 turn, 0.33 turn, and 0.25 turn of the transformer are compared to analyze affects for the loss, so as to obtain the optimum efficiency design point. The magnetic core parametric design uses a general EI core for the design. The volume parameters of the magnetic core, such as the lengths a, b, c, and d, are shown in FIG. 7.

It can be seen from FIG. 7 that the volume of the outer column of the magnetic core is shown in the following equation (3-1):

$$\left(\frac{a}{2} \cdot b\right) \cdot (a+d) \cdot 2 \qquad \text{equation (3-1)}$$

The volume of the center column is shown in the following equation (3-2):

$$(a \cdot b) \cdot (a+d) \qquad \text{equation (3-2)}$$

The connection bridge volume is shown in the following equation (3-3):

$$\frac{a}{2} \cdot b \cdot c \cdot 4 \qquad \text{equation (3-3)}$$

The magnetic core width is shown in the following equation (3-4):

$$2a+2c \qquad \text{equation (3-4)}$$

The magnetic core height is shown in the following equation (3-5):

$$a+d \qquad \text{equation (3-5)}$$

Therefore, the total volume of the magnetic core is shown in the following equation (3-6):

$$Vol=2a \cdot b \cdot (a+c+d) \qquad \text{equation (3-6)}$$

The effective cross-sectional area of the center column is shown in the following equation (3-7):

$$A_e = a \cdot b \qquad \text{equation (3-7)}$$

Assuming that the width of the copper wire on the secondary side is equal to c, the thickness of the copper wire is 3 oz, which is about 105 μm, and the length of the copper wire on the secondary side is shown in the following formula (3-8):

$$S_l = 2(a+b+2c) \qquad \text{equation (3-8)}$$

The length of interval of the primary side winding is defined as 1 mm. Therefore, in the case where only four turns are wound under the same layer of PCB winding, it can be known that the width of the copper line on the primary side is shown in the following equation (3-9):

$$P_w = \frac{c - 3 \text{ mm}}{4} \qquad \text{equation (3-9)}$$

Based on the magnetic core parametric equations (3-1) to (3-1), a total length of the primary side winding is shown in the following equation (3-10):

$$P_l = 8a + 8b + 64P_w + 48 \cdot 1 \text{ mm} \qquad \text{equation (3-10)}$$

By parameterizing elements that affect the volume of the magnetic core and the cross-sectional area of the windings, the turns of the winding can be regarded as a variation for analyzing the loss, in the condition that four rectifier switches are connected in series and the peaks of the magnetic flux of the magnetic core are fixed, the parameters are shown in the following Table I:

TABLE I

Loss of various fractional-turn transformers

|  | 16:1 | 8:0.5 | 4:0.25 |
| --- | --- | --- | --- |
| Primary side length | $4P_l$ | $2P_l$ | $P_l$ |
| Primary side resistance | $\rho \frac{4P_l}{P_w \cdot 3 \text{ oz}}$ | $\rho \frac{2P_l}{P_w \cdot 3 \text{ oz}}$ | $\rho \frac{P_l}{P_w \cdot 3 \text{ oz}}$ |
| Secondary side length | $8S_l$ | $4S_l$ | $2S_l$ |
| Secondary side resistance | $\rho \frac{8S_l}{c \cdot 3 \text{ oz}}$ | $\rho \frac{4S_l}{c \cdot 3 \text{ oz}}$ | $\rho \frac{2S_l}{c \cdot 3 \text{ oz}}$ |
| Effective cross-sectional area | a · b | 2a · b | 4a · b |
| Total volume | 2ab(a + c + d) | 4ab(2a + c + d) | 8ab(4a + c + d) |
| Loss of magnetic core | 0.1 W | 0.291 W | 0.946 W |
| Primary side copper loss | 0.361 W | 0.181 W | 0.09 W |
| Secondary side copper loss | 9.276 W | 4.638 W | 2.319 W |
| Total loss | 9.737 W | 5.11 W | 3.355 W |

The relationship between the 1/Nt turns and the loss can be derived by the equations. In order to fix the magnetic flux density under the condition of different number of turns of windings on the primary side, the area of the windings of the magnetic core are enlarged in equal proportion, here, the core loss is shown in the following equation, $P_{cv}$ is the unit volume loss versus flux density, the volume is referred to Table 1 above, and given the volume to be proportional to Nt, as shown in the following equation (3-11):

$$CoreLoss(Nt) = P_{cv}(B_{max}) \cdot ((Nt \cdot 2a) \cdot b \cdot ((Nt \cdot a) + c + d)) \qquad \text{equation (3-11)}$$

The copper loss is shown in the following equation (3-12), the number of rectifier circuits on the secondary side is proportional to Nt, and thus the currents of the rectifier circuit are inversely proportional:

$$CopperLoss(Nt) = I_{pri}^2 \cdot \left(\rho \frac{\frac{4}{Nt} P_l}{P_w \cdot 3 \text{ oz}}\right) + Nt \cdot \left(\frac{I_{sec}}{Nt}\right)^2 \cdot \rho \frac{2S_l}{c \cdot 3 \text{ oz}} \qquad \text{equation (3-12)}$$

The total loss is shown in the following equation (3-13):

$$TranLoss(Nt) = CoreLoss(Nt) + CopperLoss(Nt) \qquad \text{equation (3-13)}$$

Figure 8:
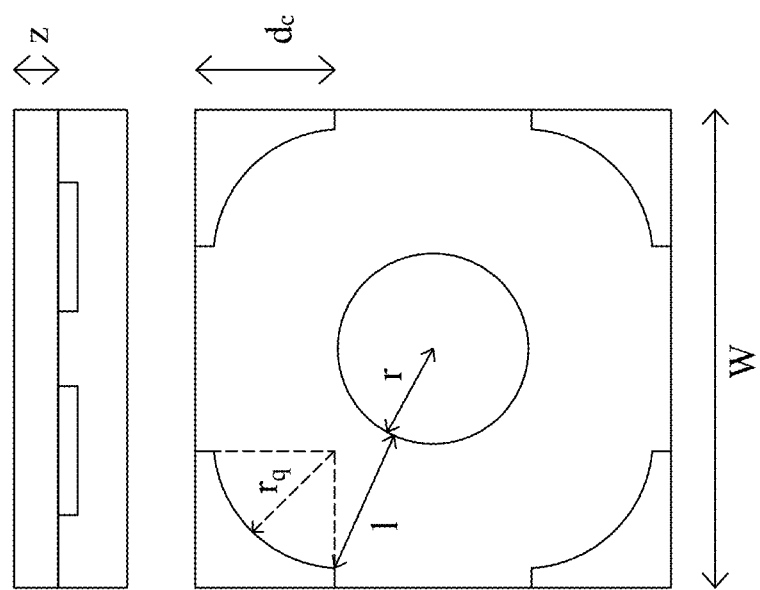
FIG. 8 is volume parameters of a magnetic core according to an embodiment of the present disclosure.

By plotting equations (3-11) through (3-13), the best loss point in the case of fixed magnetic flux of the magnetic core can be obtained. It can be seen that the optimum loss point falls within about 4.4 turns to 4.5 turns. Therefore, the magnetic core with one-quarter turns will be parametrically designed hereinafter. In the embodiment of the present disclosure, values such as the magnetic core width and the copper wire width are established as a function in that the magnetic flux serves as a variable, thereby obtaining a relationship between an optimum loss point of the magnetic core and a peak magnetic flux. Parameters of the magnetic core volume are shown in FIG. 8, where I is defined as the winding wire width.

In the embodiment of the present disclosure, a series resonant converter circuit with a circuit specification having an input voltage of 400V, an output voltage of 12V, and an operating frequency of 1 MHz is taken as an example, and thus the parameters of the magnetic core can be expressed by the following equations (4-1) to (4-3), indicates that the radius r, $r_q$, $r_d$ and length l, $d_c$, each volume parameter are the function of the maximum flux density $B_{def}$, this design is to obtain the minimum magnetic core loss and volume relationship:

$$A_e(B_{def}) = \frac{V_{in}}{4 f_{def} B_{def} N_p} \times 10^6 \qquad \text{equation (4-1)}$$

$$r(B_{def}) = \sqrt{\frac{A_e(B_{def})}{\pi}} \qquad \text{equation (4-2)}$$

$$d_c(B_{def}) = \left[\sqrt{\frac{A_e(B_{def})}{4}}\right] \qquad \text{equation (4-3)}$$

From equations (4-1) to (4-3), $r_q$ can be obtained as the following equation (4-4):

$$r_q(B_{def}) = \sqrt{\frac{4 d_c(B_{def})^2 - A_e(B_{def})}{\pi}} \qquad \text{equation (4-4)}$$

The equations (4-1) to (4-4) are organized to obtain the magnetic core width W and the thickness z as the following equations (4-5) and (4-6):

$$w(B_{def}) = 2 d_c(B_{def}) - r_q(B_{def}) + \qquad \text{equation (4-5)}$$
$$\sqrt{2 l_e^2 + 4 l_e \times r(B_{def}) - r_q(B_{def})^2 + 2 r(B_{def})^2}$$

$$z(B_{def}) = \frac{A_e(B_{def})}{4} \times \frac{1}{\sqrt{2} \, d_c(B_{def})} \qquad \text{equation (4-6)}$$

Figure 9:
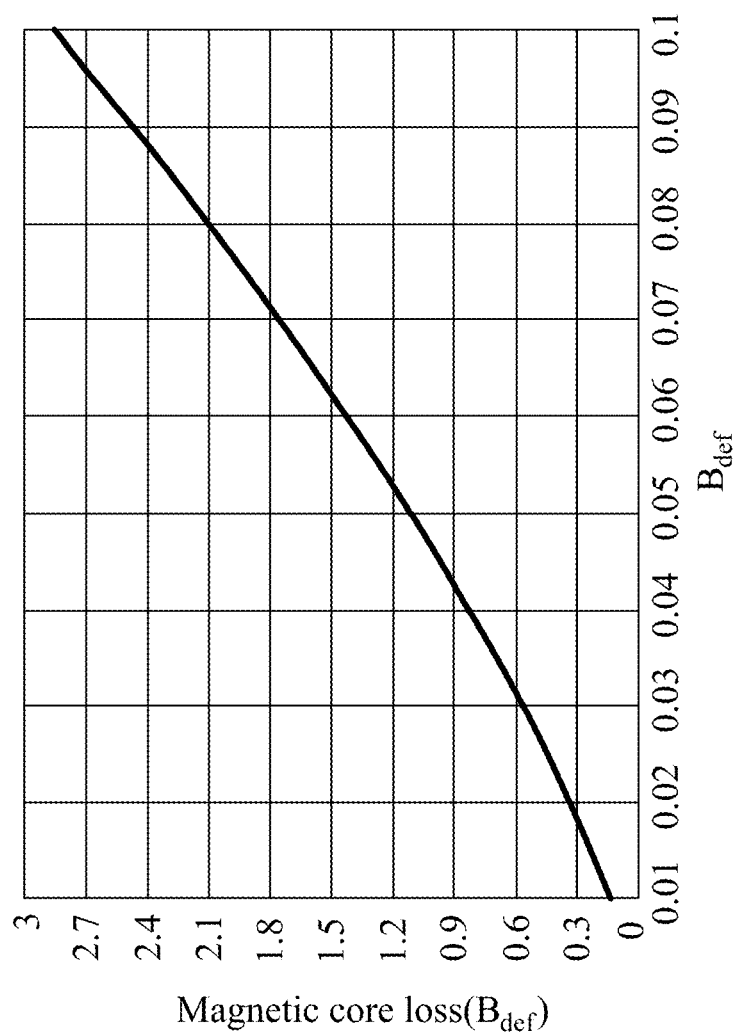
FIG. 9 is a graph showing a relationship between loss and the magnetic flux density of the magnetic core with one-quarter turn winding according to an embodiment of the present disclosure.
Figure 10:
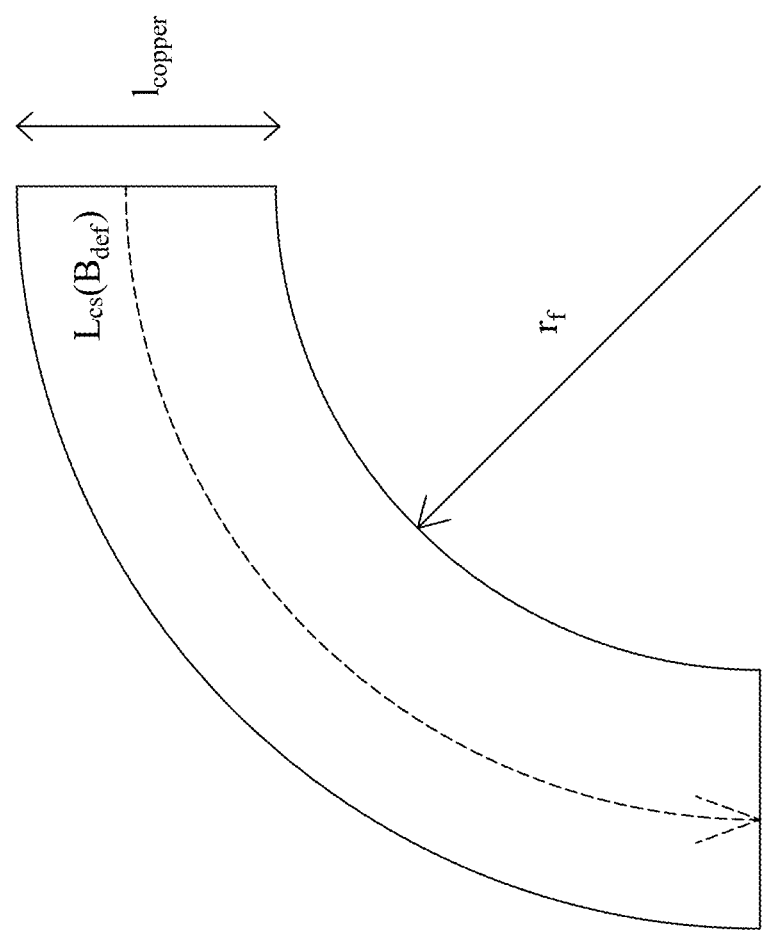
FIG. 10 is model showing parameters of one-quarter winding according to an embodiment of the present disclosure.

After the volume is obtained from the above parameter equations, the $P_{cv}$ curve provided by the magnetic core supplier can be used as a look-up table, and the relationship between the magnetic flux of the magnetic core and the loss can be obtained. The magnetic core loss of the magnetic core with one-quarter turn winding is shown in FIG. 9. After the parameterization for the magnetic core is completed, the primary side winding and the secondary windings of the magnetic core are parameterized. The parameters are shown in FIG. 10. FIG. 10 is model showing parameters of one-quarter winding.

Here, $l_{copper}$ is the secondary side winding wire width, the copper thickness is 2 oz, i.e., 0.07 mm. The primary side winding length $L_{cp}$ and the secondary side winding length $L_{cs}$ are shown in the equations (4-7) and (4-8):

$$L_{cp}(B_{def}) = 4\left[2\pi\left(\frac{r(B_{def}) + l_{copper}}{2}\right)\right] \qquad \text{equation (4-7)}$$

$$L_{cs}(B_{def}) = 2\left(\frac{r(B_{def}) + l_{copper}}{2}\right) \times \frac{\pi}{4} \qquad \text{equation (4-8)}$$

The resistances obtained from the above two equations are shown in the equations (4-9) and (4-10), where $A_{cf}$ is the winding cross-sectional area:

$$R_{cp}(B_{def}) = \rho \frac{L_{cp}(B_{def})}{A_{cf}} \times 10^6 \; (m\Omega) \qquad \text{equation (4-9)}$$

$$R_{cs}(B_{def}) = \rho \frac{L_{cs}(B_{def})}{A_{cf}} \times 10^6 \; (m\Omega) \qquad \text{equation (4-10)}$$

Figure 11A:
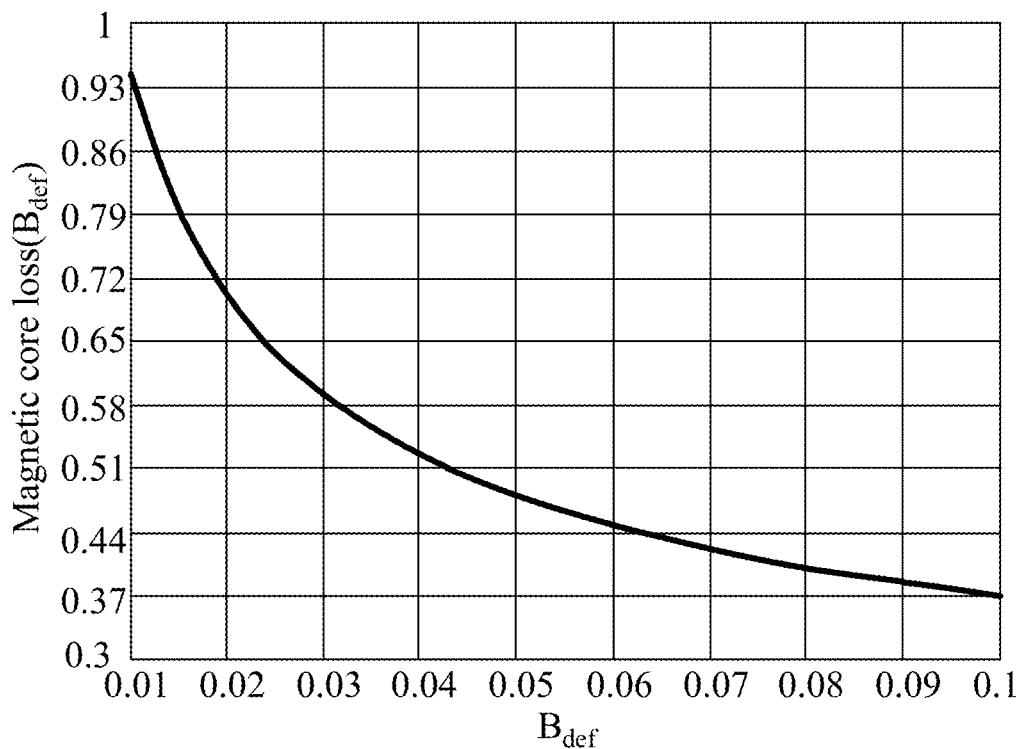
FIGS. 11A and 11B are graphs showing copper loss of the copper windings and overall loss curves, respectively.
Figure 11B:
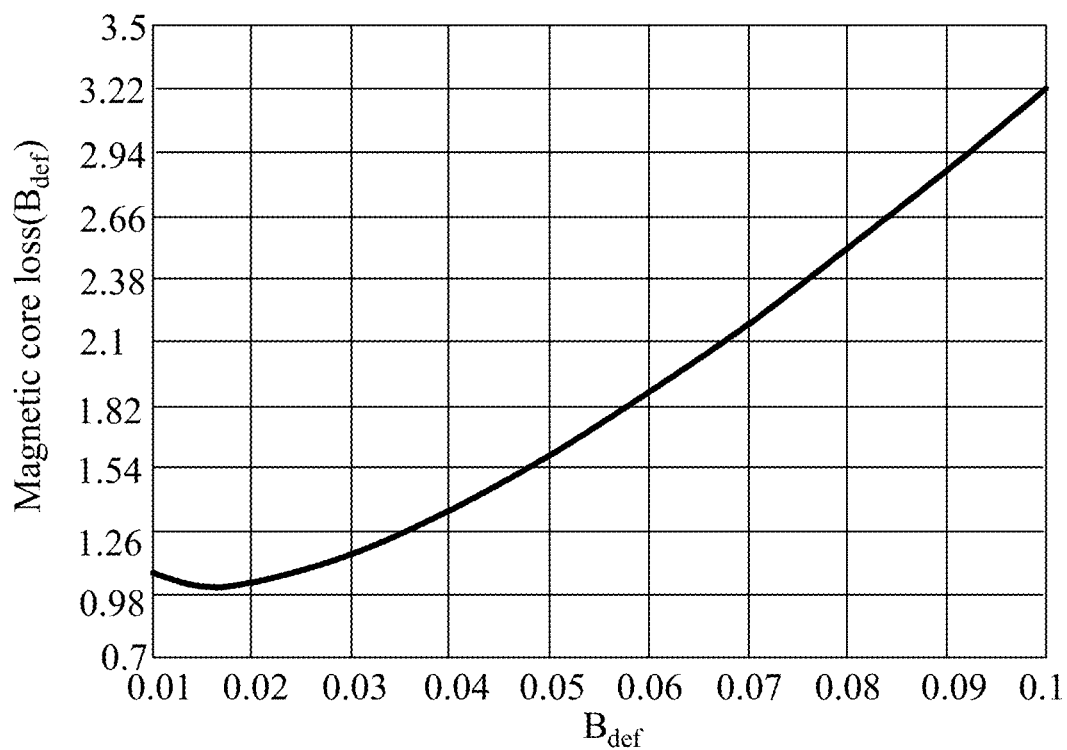

From the above equations, it can be seen that the copper loss of the copper wire winding is substantially shown in FIG. 11A at an output voltage of 12V and an output power of 750 W, and the overall loss curve is shown in FIG. 11B. From FIGS. 11A and 11B, it can be seen that the optimum loss point is located at a point that the magnetic flux of the magnetic core operates at 0.0166T, but the effective cross-sectional area of the core can only be varied to satisfy the condition that the frequency and the number of winding turns on the primary side remain unchanged, and thus the design will cause the magnetic core to be too bulky. Considering the total volume of the actual magnetic core, the peak magnetic flux density of the actual magnetic core is operated at about 0.09T.

Figure 12:
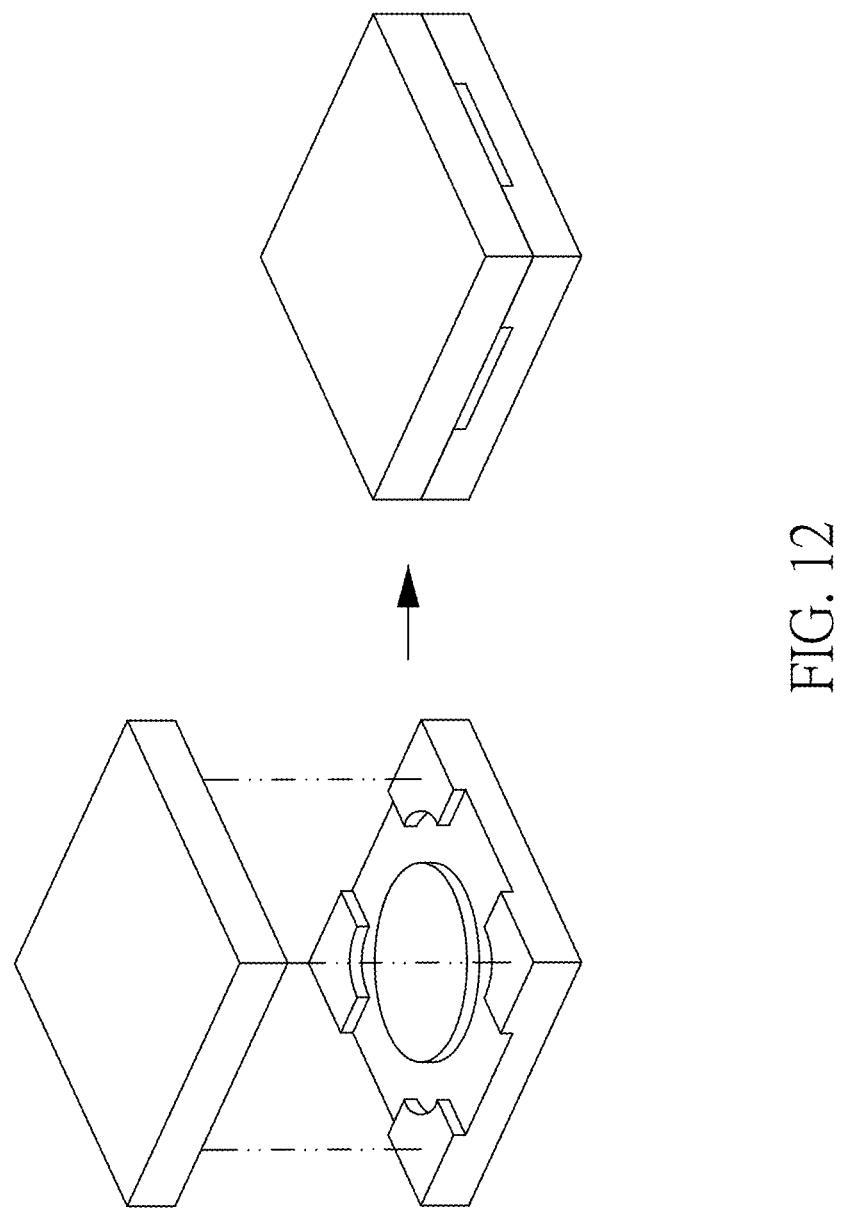
FIG. 12 is a schematic diagram of a magnetic core model of a series resonant converter according to an embodiment of the present invention.
Figure 13A:
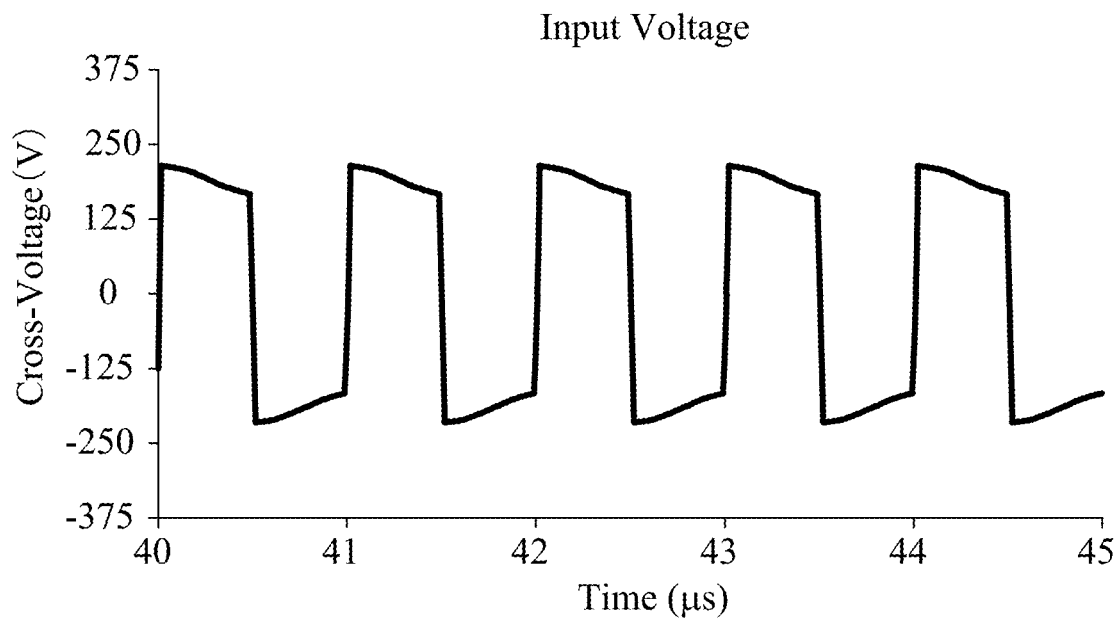
FIGS. 13A, 13B, 14A and 14B are the simulation results of primary side cross voltage and secondary side cross voltage, output voltage and inductive current of the magnetic core of the present disclosure, respectively.
Figure 13B:
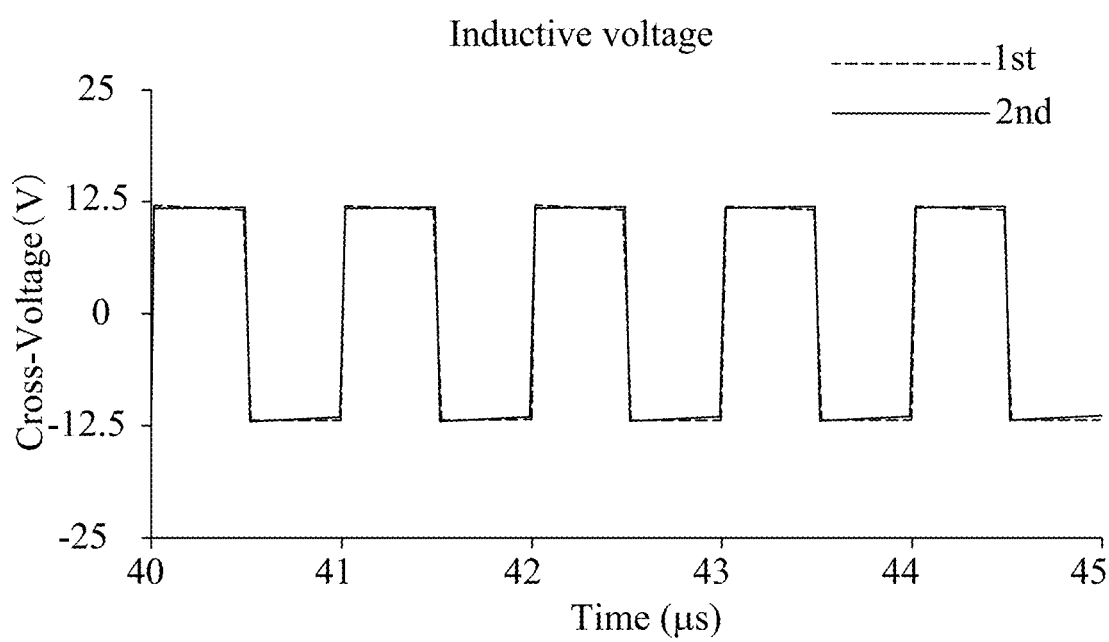
Figure 14A:
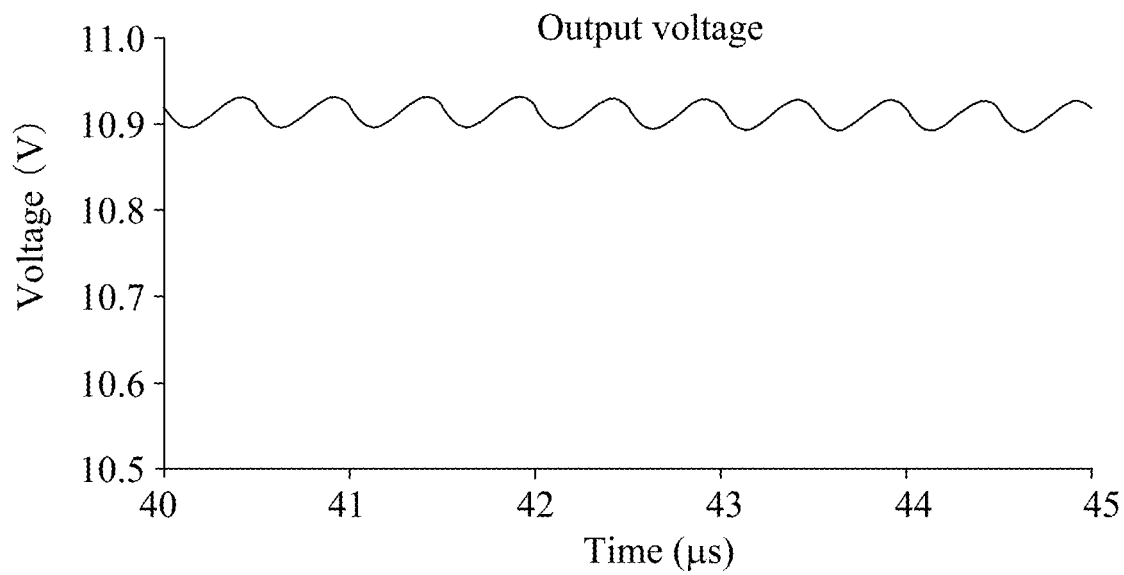
Figure 14B:
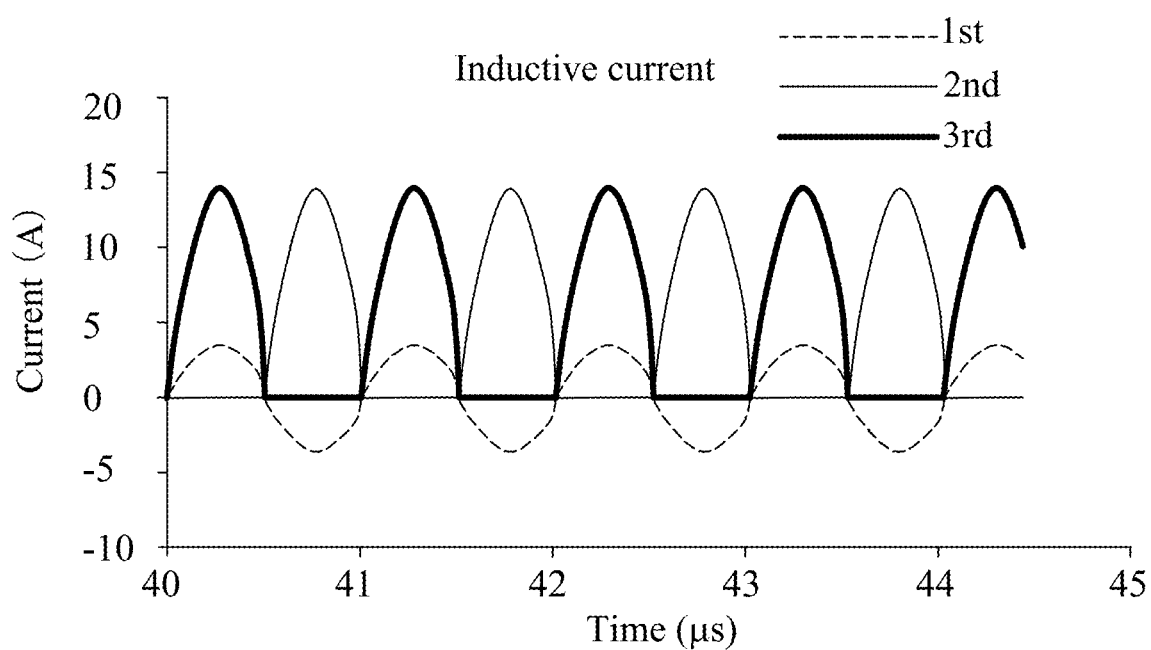

Further, the present disclosure analyzes and verifies the distribution of the magnetic flux in the magnetic core through the Maxwell simulation software, confirms whether the magnetic flux has an imbalance problem in the magnetic core, and verifies the transformer turns ratio of the secondary side winding with one-quarter turn is the same as the conventional secondary side winding wound with one turn, the built model is shown in FIG. 12, and FIG. 12 is a schematic diagram of the magnetic core model of the series resonant converter according to an embodiment of the present invention.

In the setting for the windings, each winding needs to be provided with an excitation source and a direction of the excitation source. The excitation source can be provided by using the built-in function to input voltage, current and other parameters, or the excitation source can be generated by using an external circuit function of the Maxwell simulation software, for example, switching operations for the switches or waveform generators. The present disclosure utilizes an external circuit function to connect a capacitor and an inductor in series on the primary side of the transformer, and generates a square wave voltage across the capacitor, the inductor and the transformer by using a waveform generator to simulate actions of the LLC series resonant converter. Using the finite element analysis method of Maxwell simulation software, transient simulation analysis can be used in 3D simulation. After waiting for the simulation enters the steady state, the simulation results are obtained, and the input voltage, output voltage, output current, magnetic field distribution, core loss and so on are extracted. The circuit simulation parameters are shown in Table II below:

TABLE II

Parameters for simulating series resonant matrix transformer circuit

| Specification Item | Circuit parameter |
|---|---|
| Turn ratio of transformer | 4:0.25 |
| Resonant capacitance | 18.8 nF |
| Resonant inductance | 5.73 μH |
| Cross-voltage of transformer | 400 V |
| Magnetizing inductance | 24.6 μH |
| Resonant frequency | 1000 kHz |
| Air gap | 0.125 mm |

Reference is now made to FIGS. 13A, 13B, 14A and 14B, which are the simulation results of primary side cross voltage and secondary side cross voltage, output voltage and inductive current of the magnetic core of the present disclosure, respectively. As shown in FIGS. 13A, 13B, 14A and 14B, it can be seen from FIGS. 13A and 13B that a ratio of the input voltage to the output dropping voltage is 16 to 1.

Figure 15B:
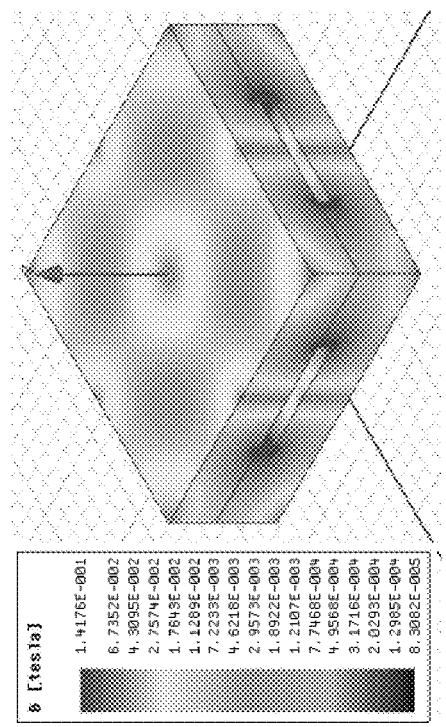
FIG. 15B is a magnetic flux distribution diagram of the magnetic core that balances magnetic flux by an external circuit according to an embodiment of the present disclosure.
Figure 15A:
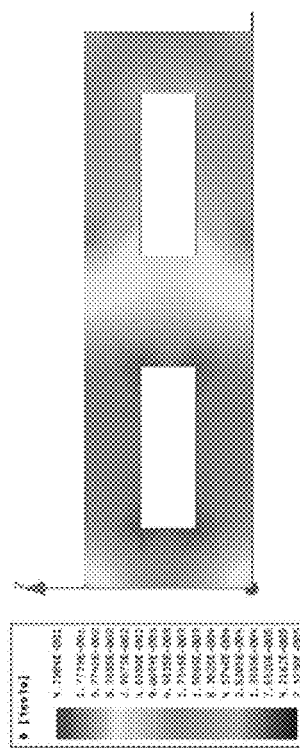
FIG. 15A is a magnetic flux distribution diagram of only a half turn of winding is wound without utilizing any magnetic flux balancing mechanism according to an embodiment of the present disclosure.

FIG. 15A is a magnetic flux distribution diagram of only a half turn of winding is wound without utilizing any magnetic flux balancing mechanism, and FIG. 15B is a magnetic flux distribution diagram of the magnetic core that balances magnetic flux by an external circuit. Comparing FIG. 15A with FIG. 15B, it can be seen that the distribution of the magnetic flux inside the magnetic core after balancing the magnetic flux via the external circuit is extremely uniform. It can also be seen from FIG. 14B that the resonant current does not appear to be unbalanced in positive and negative half cycles. It can be seen from the simulation results that the magnetic flux is balanced by simultaneously turning on the external circuits of each group, and thus excellent effects can be obtained on the distribution of the magnetic flux, and since the primary winding is four turns and each of the secondary windings is one-quarter turn, the voltage ratio relationship between the primary side and the secondary side is still the same as that of the transformer with the secondary side wound with complete one turn, which is 16:1.

In summary, the present disclosure utilizes characteristics that the power switching element on the primary side can be zero-voltage switched to ON state, and the rectifier switches on the secondary side can be zero-current switched to OFF state in the LLC series resonant converter circuit, the switching loss of the circuit at high frequency can be greatly reduced. In the magnetic core design, the parameterized method is utilized to obtain the best efficiency point. After the design is completed, the magnetic simulation software is used to estimate the core loss value, while the copper loss on the secondary side in direct-current (DC) operation can be effectively reduced in the form of a fractional-cycle. Since the converter operates at the resonant point in a way of open-loop, the magnetic core loss can be accurately obtained.

In order to make the structure of the magnetic core satisfy the requirements of high efficiency and high power density, a parameterized design that converts the volume of the magnetic core into a magnetic flux density function is utilized to obtain a value that can satisfy the requirements of small volume and low loss, and the best point of volume and loss that the magnetic core under different conditions can then be found. Finally, a magnetic core with a total loss of 2.731 W and a length and width of about 32 mm was obtained. If a 1.5 mm side flap is added to each of the four sides, a magnetic core having a loss of 2.074 W and a length and width of 35 mm can be obtained. Use the parameters as an optimal design, the overall circuit efficiency was successfully improved, and an LLC series resonant converter using a fractional-cycle transformer with an input voltage of 380V, an output voltage of 12V, an output rated power of 750 W, and an operating frequency of 1 MHz was realized in an open-loop manner.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A series resonant converter, comprising:
    a switching circuit having a power source connected to a primary side upper bridge switch and a primary side lower bridge switch, wherein the primary side upper bridge switch and the primary side lower bridge switch are configured to control an input voltage and an input current from the power source;
    a resonant tank coupled to the switching circuit, including a resonant inductor, a resonant capacitor and a magnetizing inductor connected in series;
    a transformer coupled to the resonant tank, including:
        a magnetic core having an upper portion, a lower portion, and a center column and four outer columns disposed between the upper portion and the lower portion, wherein the four outer columns are disposed around the center column, and the upper portion and the lower portion respectively have thicknesses;
        a primary side winding wound on the center column; and
        at least four secondary side windings wound on the center column, wherein a number of equivalent winding turns summed by the at least four secondary side windings on the center column is 1; and
    a rectifier circuit having a plurality of secondary side output rectifier switches coupled to the transformer, configured to receive and rectify an output voltage and an output current of the transformer, wherein the plurality of secondary side output rectifier switches are coupled to an output capacitor and a load, and
    wherein the at least four secondary side windings are coupled to the plurality of secondary side output rectifier switches through a space between two of the four outer columns, respectively.

2. The series resonant converter according to claim 1, wherein a number of winding turns of each of the at least four secondary side windings is one quarter.

3. The series resonant converter according to claim 1, wherein a number of the primary side winding is 4.

4. The series resonant converter according to claim 1, wherein each of the at least four secondary side windings is a central tap structure and includes a positive half cycle winding and a negative half cycle winding, and each of the plurality of secondary side output rectifier switches includes a positive half cycle rectifier switch and a negative cycle rectifier switch, and wherein each of the positive half cycle windings is coupled to each of the positive half cycle rectifier switches, and each of the negative half cycle windings is coupled to each of the negative half cycle rectifier switches.

5. The series resonant converter according to claim 3, wherein a number of equivalent winding turns summed by the positive half cycle windings of the at least four secondary side windings is 1, and a number of equivalent winding turns summed by the negative half cycle windings of the at least four secondary side windings is 1.

6. The series resonant converter according to claim 3, wherein in a positive half cycle operation mode, the primary side upper bridge switch is turned on, the primary side lower bridge switch is turned off, each of the positive half cycle rectifier switches is turned on, and each of the negative half cycle rectifier switches is turned off;

wherein in a negative half cycle operation mode, the primary side upper bridge switch is turned off, the primary side lower bridge switch is turned on, each of the positive half cycle rectifier switches is turned off, and each of the negative half cycle rectifier switches is turned on; and wherein in the positive half cycle operation mode, current paths generated on the primary side winding and the at least four secondary side windings are different from those in the negative half cycle operation mode.

7. The series resonant converter according to claim 1, wherein the primary side upper bridge switch and the primary side lower bridge switch are enhanced gallium nitride field-effect transistors (FETs).

8. The series resonant converter according to claim 1, wherein a number of winding turns of each of the at least four secondary side windings is one-eighth, and a number of the at least four secondary side windings is 8.

9. The series resonant converter according to claim 8, wherein the magnetic core is an eight-column square magnetic core, which further includes eight outer columns, and wherein eight secondary side windings are coupled to the plurality of secondary side output rectifier switches through spaces between two of the eight outer columns, respectively.

* * * * *